June 16, 1953  C. S. REED  2,642,125
SPRING CONSTRUCTION
Filed March 21, 1951
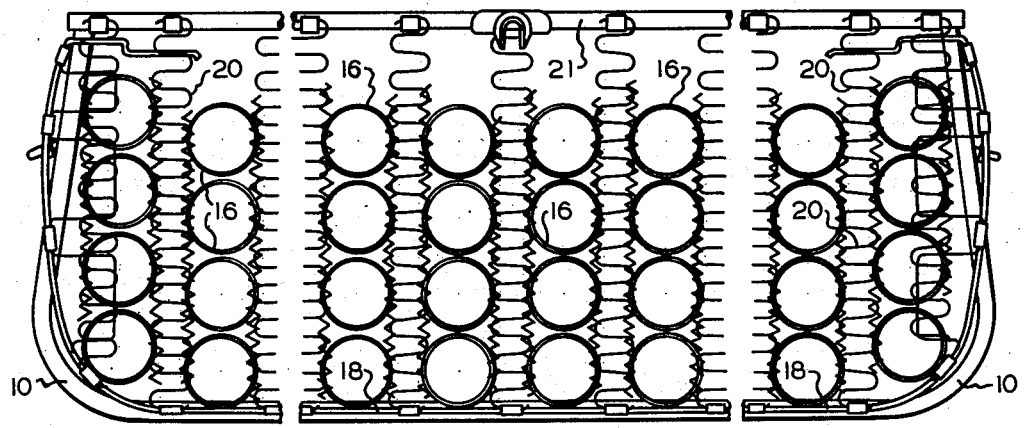
FIG. I.
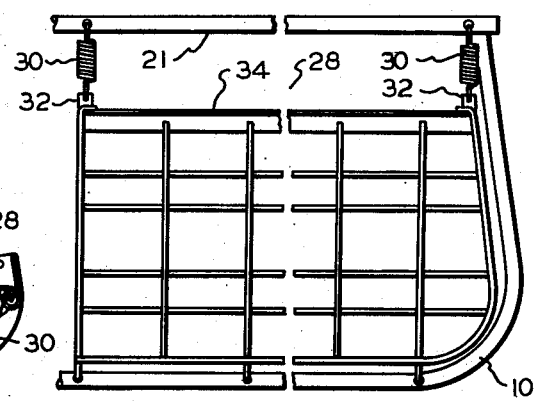
FIG. III.  FIG. IV.
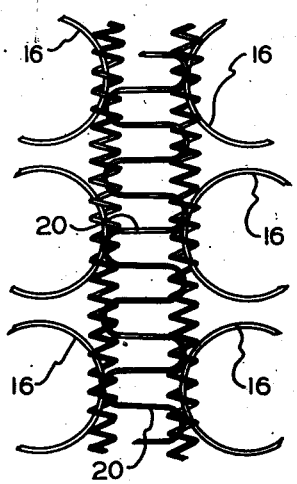
FIG. V.
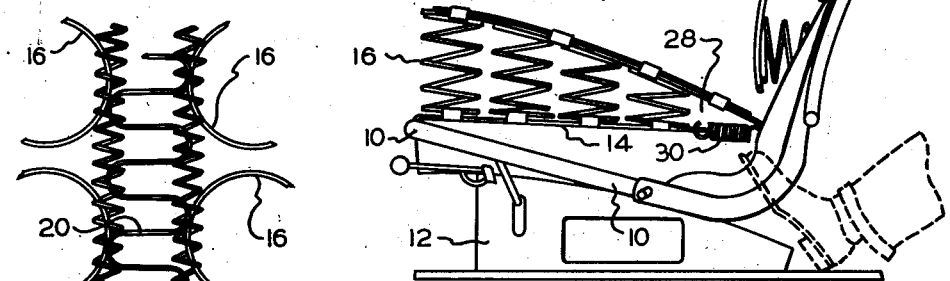
FIG. II.
INVENTOR
CLAIR S. REED
BY
ATTORNEY Patented June 16, 1953

2,642,125

UNITED STATES PATENT OFFICE 2,642,125

SPRING CONSTRUCTION

Clair S. Reed, Jackson, Mich., assignor to Reynolds Spring Company, Jackson, Mich., a corporation of Delaware Application March 21, 1951, Serial No. 216,775

4 Claims. (Cl. 155—179)

The present invention relates to improvements in cushion seat construction being particularly well adapted for front seat use in automobiles.

In the past, coil springs have been extensively employed in the fabrication of seat cushions for automobiles. With the recent trend in body design of placing the rear seat forward of the rear axle to improve the riding qualities, toe room for the rear seat occupants has become a problem. As standard coil spring front seat constructions do not lend themselves to toe room provision along the rear edge, some manufacturers of automobiles have been compelled to employ other, and in some respects inferior, forms of resilient elements to provide a front seat construction which would have toe room clearance along the rear edge.

According to the present invention, a departure has been made from standard coil spring seat construction which permits extensive use of coil springs yet the suspension of the coil springs in the construction is such that adequate toe room clearance is provided along the rear edge of the seat. This has been accomplished through the employment of a frame, upon which the coil springs are mounted, hinged at the front of the seat frame and supported from tension coil springs at the rear of the seat frame. In practice, the frame carrying the coil springs is off-set forwardly of the rear portion of the seat with the result that the rear row of coil springs is located substantially forward of its usual position in coil spring seat construction in automobiles. To provide resilient support at the rear edge of the seat cushion adjacent the back cushion of the seat, arcuate so-called zig-zag spring elements have been combined with the coil springs.

The resilient hinged suspension of the frame supporting the coil springs permits a substantial reduction in spring height yet still provides a deep riding cushion effect without any tendency to "strike bottom" over rough roads. Also, as the coil springs are supported forward of the rear edge of the front seat construction a substantial distance, adequate toe room clearance is provided beneath the seat between the floor of the automobile and the point of attachment of the arcuate zig-zag spring element attached along the rear edge of the seat construction.

Thus, an object of the invention is to provide an improved cushion seat construction which may be economically manufactured and has exceptional riding qualities when employed in automobiles.

Another object is to provide a front seat construction for automobiles which is predominately fabricated from coil springs yet provides adequate toe room clearance along the rear edge thereof.

Another object is to provide a seat cushion for automobiles in which coil springs are supported upon a resiliently suspended hinged frame.

A further object of the invention is to provide a seat construction for automobiles in which coil springs and arcuate zig-zag springs have been employed in an entirely new and different arrange to provide a seat construction especially adapted for use as a front seat in that it provides adequate toe room clearance for rear seat occupants.

These and other objects and advantages residing in the present invention will more fully appear from a consideration of the following specification and claims.

In the drawings,

Fig. I is a broken plan view of a seat construction embodying the present invention with the hinged sub-frame omitted for purposes of clarity, Fig. II is an end elevational view of an upholstered seat embodying the present invention illustrating the toe room for back seat occupants, Fig. III is a vertical cross-sectional view taken through the center line of Fig. I, Fig. IV is a plan view of one of the constructions shown in Fig. I showing the sub-frame with the spring elements removed for purposes of clarity, and Fig. V is an enlarged plan view of a portion of the seat structure shown in Fig. I illustrating the method of association between the coils and the zig-zag spring elements.

Referring to Figs. I and II the seat construction comprises a lower frame 10 supported on the adjustable carriage 12, for adjusting the front seat relative to the steering wheel of an automobile in a well known manner. One or more intermediate frames 14 support the coil springs 16 at their lower ends. An upper border frame 18 has upper coils of certain of the springs 16 clipped thereto in a conventional manner. As more clearly shown in Fig. I, the transverse rows of the springs 16 are separated by zig-zag springs 20 which are hingedly connected at their lower and rear ends to the cross frame portion 22 of the frame 10 and extend upwardly and forwardly to be connected at their front ends to the border frame 18. Fig. V shows one convenient method of connecting the springs 20 to the top coils of the springs 16 through interlaced helical springs 24.

The frames 14 are two in number in the illustrated form. It will be understood, however, that only a single frame may be used extending across the entire width of the seat or the area of support of the coils 16 may be broken up between two or more sections. As shown, the frames 14 have forward hooks 24 which engage in openings in the front cross frame portion 26 to form a hinge joint therewith. The depth of the frames 14 is substantially less than the distance between the cross frame portions 20 and 26 to provide toe clearance at 28 forward of the cross frame portion 20, as shown in Fig. III. Close wound helical springs connected between the frame portion 20 and anchor plate 32 on the back portion 34 of the frames 14, support the frames 14 between the cross frames 20 and 26.

It will be noted that the zig zag springs 20 bridge that portion of the upholstered surface between the top coil of the back row of the springs 16 and the cross frame portion 20. From Fig. IV it will also appear that the springs 30 are widely spaced to the sides of the toe space 28. In operation, it will be understood that the initial deflection is taken by the springs 16 and 20. However, the frames 34 are resilient supports and hinge about the cross frame 26 extending the springs 30 under increasing load conditions. By selecting springs 30 of different stiffness, the riding characteristics of the seat construction may be conveniently altered in service.

I claim:

1. A cushion seat construction comprising a main structure having a base, front, side and rear members with said front and side members being located above said base, a frame located substantially in the same plane as said front and rear members, a hinged connection between said frame and said front member, said frame having its rear edge located forward of said rear member a substantial distance to provide toe clearance along the rear edge of the seat construction, tension coil springs connected between said frame and said rear member to resiliently support said frame relative to said plane, cushion coil springs supported upon said frame and having upper coils defining a resilient upper surface above said frame, and flat spring elements connected to said rear member and extending upwardly and forwardly into the surface of said upper coils and connected thereto to bridge the spacing between said tension coil springs and frame and said rear member above the toe clearance space defined between said frame and said rear member.

2. A cushion seat construction as defined in claim 1 wherein said flat spring elements are in the form of longitudinally extensible zig-zag construction.

3. A cushion seat construction as defined in claim 1 wherein said flat spring elements are in the form of longitudinally extensible zig-zag springs and said cushion coil springs are in transverse rows with said zig-zag springs being disposed between adjacent transverse rows of said cushion coil springs.

4. A cushion seat construction comprising a main structure having a base, front, side and rear members with said front and rear members being located above said base, a frame located above said base and between said front and rear members, said frame having a front edge and a rear edge, a close hinge connection between said front member and the front edge of said frame, the rear edge of said frame being substantially spaced from said rear member, tension coil springs connecting the rear edge of said frame and said rear member to resiliently suspend the rear edge of said frame for resiliently supported movement about said hinge connection, cushion coil springs having their lower coils supported upon said frame and their upper coils defining a resilient surface above said frame and located forwardly and above said rear member, and resilient structure connected to said rear member and extending upwardly and forwardly into the resilient surface defined by the top coils of said cushion spring to provide a resilient supporting face for the upholstery between said rear member and said coil springs.

CLAIR S. REED.

References Cited in the file of this patent

UNITED STATES PATENTS

| Number | Name | Date |
| --- | --- | --- |
| 2,029,182 | Meutsch | Jan. 28, 1936 |
| 2,051,087 | Jones | Aug. 18, 1936 |
| 2,083,810 | Bank | June 15, 1937 |
| 2,101,054 | Eaton | Dec. 7, 1937 |
| 2,155,792 | Johnson | Apr. 25, 1939 |
| 2,242,919 | Machman et al. | May 20, 1941 |
| 2,292,597 | Bartlett et al. | Aug. 11, 1942 |
| 2,420,220 | Bartlett et al. | May 6, 1947 |